(12) United States Patent
Pinto, IV et al.

(10) Patent No.: US 8,776,515 B2
(45) Date of Patent: Jul. 15, 2014

(54) PUMPING ASSEMBLY USING ACTIVE MATERIALS

(75) Inventors: Nicholas W. Pinto, IV, Ferndale, MI (US); Scott R. Webb, Macomb Township, MI (US); Paul W. Alexander, Ypsilanti, MI (US); Thomas W. Cox, Lapeer, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 13/280,387

(22) Filed: Oct. 25, 2011

(65) Prior Publication Data

US 2013/0098029 A1   Apr. 25, 2013

(51) Int. Cl.
*F03G 7/06*   (2006.01)
(52) U.S. Cl.
CPC ..................................... *F03G 7/065* (2013.01)
USPC .............................................. 60/528; 60/527
(58) Field of Classification Search
CPC .............................. F03G 7/065; F05C 2251/08
USPC .................. 60/527–529, 329; 417/321, 410.1
See application file for complete search history.

(56) References Cited

U.S. PATENT DOCUMENTS

| | | | | | |
|---|---|---|---|---|---|
| 4,347,049 | A | * | 8/1982 | Anderson | 417/403 |
| 4,811,564 | A | * | 3/1989 | Palmer | 60/527 |
| 5,079,920 | A | * | 1/1992 | Whitehead et al. | 60/527 |
| 5,647,515 | A | * | 7/1997 | Zwijnenberg et al. | 222/389 |
| 6,151,897 | A | * | 11/2000 | Baumbick | 60/527 |
| 6,916,159 | B2 | * | 7/2005 | Rush et al. | 417/321 |
| 2010/0199982 | A1 | * | 8/2010 | Hansen | 128/200.21 |

FOREIGN PATENT DOCUMENTS

JP           2001355537 A   * 12/2001

* cited by examiner

*Primary Examiner* — Thomas Denion
*Assistant Examiner* — Laert Dounis
(74) *Attorney, Agent, or Firm* — Quinn Law Group, PLLC

(57) ABSTRACT

A pumping assembly is provided. The assembly includes a first movable element selectively movable within a first pump housing and an actuator including an active material. The active material is configured to undergo a change in attribute in response to an activation signal. The active material is operatively connected to the first movable element such that the change in attribute causes the first movable element to move within the first pump housing. In one example, the active material is a shape memory alloy material having a crystallographic phase that is changeable between Austenite and Martensite in response to the activation signal.

8 Claims, 3 Drawing Sheets

PUMPING ASSEMBLY USING ACTIVE MATERIALS

TECHNICAL FIELD

The invention relates in general to a pump, and more specifically, to a pump employing an active material.

BACKGROUND

Vehicle windshield washer systems typically include a washer fluid reservoir mounted in the engine compartment. A motor-driven pump typically draws fluid from the reservoir and pumps the fluid under pressure to spray nozzles in the vicinity of the windshield to spray the fluid over the windshield. Such motorized pumps typically generate noise. During inclement weather, rain or snow may accumulate on the windshield, where it may freeze to ice.

SUMMARY

A pumping assembly using an active material is provided. The pumping assembly eliminates the use of motorized pumps. The assembly includes a first movable element selectively movable within a first pump housing and an actuator including an active material. The active material is configured to undergo a change in attribute in response to an activation signal. The active material being operatively connected to the first movable element such that the change in attribute causes the first movable element to move within the first pump housing. In one example, the active material is a shape memory alloy material having a crystallographic phase that is changeable between Austenite and Martensite in response to the activation signal.

The first pump housing defines first and second chambers that are separated by the first movable element. The actuator is configured to selectively fill the first chamber with fluid or selectively pump fluid out of the first chamber. A biasing member is configured to selectively fill the first chamber with fluid or selectively pump fluid out of the first chamber.

In one embodiment, the active material may function as both a heating element for the fluid and as a pump actuator. For a vehicle during icy conditions, using heated washer fluid reduces ice build-up on the windshield and improves wiper performance. In another embodiment, the pumping assembly includes a second pump housing with a second actuator composed of an active material. By employing multiple actuators, the time required to pump a predetermined amount of fluid is reduced. For example, the time required to clear a vehicle windshield of debris, ice and snow is reduced. In another embodiment, the pumping assembly allows the sizing of each single shot of fluid pumped from the first chamber.

The above features and advantages and other features and advantages of the present invention are readily apparent from the following detailed description of the best modes for carrying out the invention when taken in connection with the accompanying drawings.

DETAILED DESCRIPTION

Figure 1:
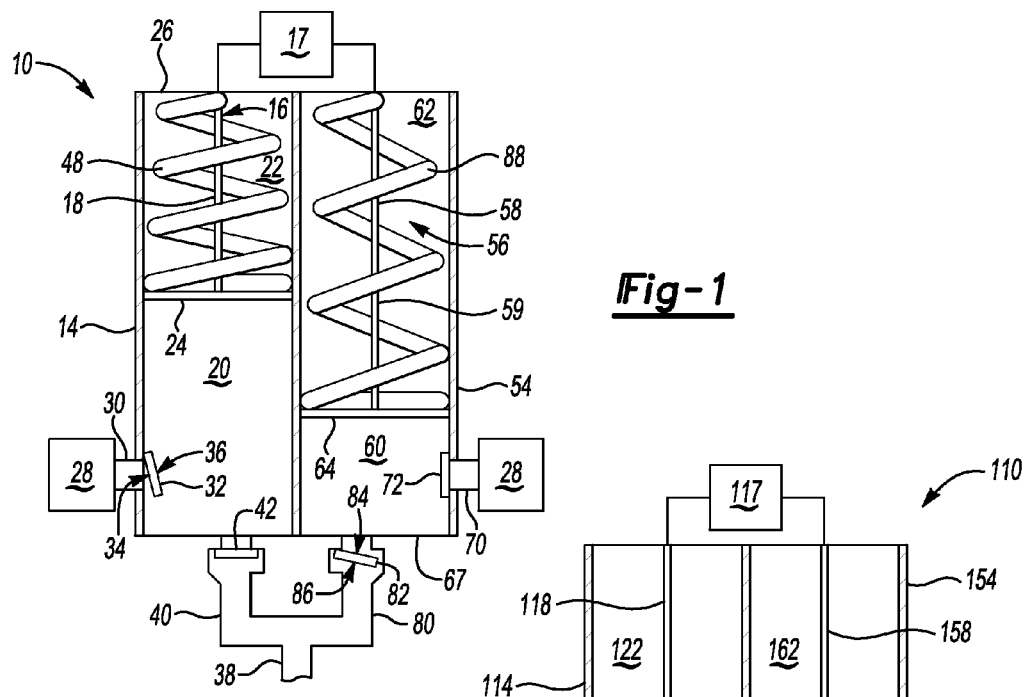
FIG. 1 is a schematic fragmentary sectional side view of a first embodiment for a pumping assembly, in accordance with the present disclosure.

Referring to the Figures, wherein like reference numbers refer to the same or similar components throughout the several views, FIG. 1 is a schematic fragmentary partly sectional side view of a pumping assembly 10. Referring to FIG. 1, the assembly 10 is shown with two pumps defined by first and second pump housings 14, 54. However, one of ordinary skill in the art may select any number of pumps as desired for the particular application, for example, the assembly 10 may include only one pump. Referring to FIG. 1, actuators 16, 56 are positioned in the respective first and second pump housings 14, 54. At least a portion of the actuators 16, 56 are active materials that are configured to undergo a change in at least one attribute in response to an activation signal.

A controller 17 may be operatively coupled to the actuators 16, 56 and configured to provide an activation signal. The activation signal may include, but is not limited to, a heat signal or an electrical signal, with the particular activation signal dependent on the active material. In the embodiment shown, the active materials are shape memory alloy (SMA) wires 18, 58. For example, the controller 17 may direct an electrical current through the actuators 16, 56 to resistively heat their respective shape memory alloy components, i.e. SMA wires 18, 58. As used herein the term "wire" is non-limiting and shall include other similar geometric configurations presenting tensile load strength/strain capabilities, such as cables, bundles, braids, ropes, strips, chains, ribbons, springs and other elements.

Suitable shape memory alloys can exhibit a one-way shape memory effect, an intrinsic two-way effect, or an extrinsic two-way shape memory effect depending on the alloy composition and processing history. As previously noted, two phases that occur in shape memory alloys are often referred to as Martensite and Austenite phases. The Martensite phase is a relatively soft and easily deformable phase of the shape memory alloys, which generally exists at lower temperatures. The Austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic two-way shape memory effect are fabricated from a shape memory alloy composition that will automatically reform themselves upon removal of the cause for deviation.

Suitable shape memory alloy materials may include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. The specific shape memory alloy material may be selected according to expected operating temperatures that the pumping assembly 10 will be used with. In one specific example, the shape memory alloy material may include nickel and titanium.

A shape memory alloy is characterized by a cold state, i.e., when the temperature of the alloy is below its Martensite finish temperature $M_f$. A shape memory alloy is also characterized by a hot state, i.e., when the temperature of the alloy is above its Austenite finish temperature $A_f$. An object formed of the alloy may be characterized by a threshold shape. When the object is pseudo-plastically deformed from its threshold shape in the cold state, the strain may be reversed by heating the object above its austenite finish temperature $A_f$, i.e., applying a thermal activation signal sufficient to heat the object above its $A_f$ will cause the object to return to its threshold shape. An SMA's modulus of elasticity and yield strength are also significantly lower in the cold state than in the hot state. As understood by those skilled in the art, pseudo-plastic strain is similar to plastic strain in that the strain persists when the shape memory alloy is in the cold state.

Referring to FIG. 1, the first pump housing 14 includes first and second chambers 20, 22. The assembly 10 may include any number of chambers. A first movable element 24 separates the first and second chambers 20, 22 and is selectively movable within the first pump housing 14. The first movable element 24 may be composed of rubber and is configured to seal the first chamber 20 from the second chamber 22. The first movable element 24 is operatively connected to the SMA wire 18 such that the change in attribute in response to an activation signal causes the first movable element 24 to move within the first pump housing 14. In the embodiment shown, the actuator 16 defines two ends. One end of the actuator 16 may be operatively connected to a fixed structure, such as a first end 26 of the first housing 14. Another end of the actuator 16 may be operatively connected to the first movable element 24.

Referring to FIG. 1, the first chamber 20 is operatively connected to a fluid feed 28 through an inlet portion 30. In one example, the fluid feed 28 is a fluid reservoir in a vehicle. An inlet valve 32 is positioned between the first chamber 20 and the inlet portion 30. Referring to FIG. 1, the first chamber 20 is operatively connected to a nozzle 38 through an outlet portion 40. An outlet valve 42 is positioned between the first chamber 20 and the outlet portion 40. In the embodiment shown, the inlet and outlet valves 32, 42 are one-way flap valves.

Similar to the first pump housing 14, the second pump housing 54 includes a second movable element 64 separating first and second chambers 60, 62. Referring to FIG. 1, the first chamber 60 is operatively connected to the fluid feed 28 through an inlet portion 70. An inlet valve 72 is positioned between the first chamber 60 and the inlet portion 70. Referring to FIG. 1, the first chamber 60 is operatively connected to the nozzle 38 through an outlet portion 80. An outlet valve 82 is positioned between the first chamber 60 and the outlet portion 80. In the embodiment shown, the inlet and outlet valves 72, 82 are one-way flap valves.

The SMA wires 18, 58 are characterized by respective predetermined lengths. When the SMA wires 18, 58 are in their respective cold states, their elastic modulus and yield strength are sufficiently low such that the SMA wires 18, 58 are elongated from their predetermined length. Biasing members, such as compression springs 48, 88 shown in FIG. 1, are positioned in the respective second chambers 22, 62 and configured to bias the respective SMA wires 18, 58 towards their elongated positions.

Referring to FIG. 1, the controller 17 may provide an electrical signal that resistively heats the SMA wires 18, 58 to a point where a crystallographic phase transformation occurs from Martensite to Austenite. In other words, the SMA wires 18, 58 transition from a cold state to a hot state. The SMA wire 18 in the first pump housing 14 is shown in a hot state. When activated to its hot state, the SMA wire 18 contracts to its Austenitic state and increases in modulus, thereby drawing or moving the first movable element 24 towards a first end 26 of the first pump housing 14 as well as compressing the compression spring 48. This creates a pressure difference between the fluid feed 28 and the first chamber 20, allowing it to pull fluid into the chamber 20, as described below.

Referring to FIG. 1, a first face 34 of the inlet valve 32 is subject to a first pressure $P_1$, which is the pressure in the inlet portion 30. Pressure $P_1$ may be approximately equal to the atmospheric pressure. A second face 36 of the inlet valve 32 is subject to a second pressure $P_2$, which is the pressure in the first chamber 20. When the pressure differential (difference between $P_1$ and $P_2$) across the first and second faces 34, 36 reaches a sufficiently high value, the inlet valve 32 opens and fluid from the fluid feed 28 enters the first chamber 20 through the inlet portion 30. As the fluid enters and pools in the first chamber 20, the pressure $P_2$ in the first chamber 20 is increased, thereby reducing the pressure differential (difference between $P_1$ and $P_2$). When the pressure differential across the first and second faces 34, 36 falls below a predetermined value, the inlet valve 32 closes.

Upon the removal of the activation signal, the SMA wires 18, 58 cool, and transition to their cold or Martensite states. The SMA wire 58 is shown in a cold or Martensite state. Once in the cold state, its elastic modulus and yield strength are sufficiently low that the SMA wire 58 is elongated from its predetermined length as the compression spring 88 pulls the SMA wire 58. The compression spring 88 urges the SMA wire 58 towards its elongated position 59, moving the second movable element 64 towards a second end 67 of the second pump housing 54. The fluid that had pooled in the first chamber 60 is now compressed, thereby increasing the pressure $P_2$ in the first chamber 60.

Referring to FIG. 1, a first face 84 of the outlet valve 82 is subject to the second pressure $P_2$, which is the pressure in the first chamber 60. A second face 86 of the outlet valve 82 is subject to a third pressure $P_3$, which is the pressure in the outlet portion 80. When the pressure differential (difference between $P_2$ and $P_3$) across the first and second faces 84, 86 reaches a sufficiently high value, the outlet valve 82 opens and fluid from the first chamber 60 is pumped to the outlet portion 80. As the fluid leaves the first chamber 60, the pressure $P_2$ in the first chamber 60 is reduced, thereby reducing the pressure differential (difference between $P_2$ and $P_3$). When the pressure differential across the first and second faces 84, 86 falls below a predetermined value, the outlet valve 82 closes.

Thus in the first embodiment, the SMA wires 18, 58 are configured to selectively fill the respective first chambers 20, 60 with fluid while the compression springs 48, 88 are configured to apply a biasing force to selectively pump fluid out of the respective first chambers 20, 60. The SMA wires 18, 58 and compression springs 48, 88 are positioned in the respective second chambers 22, 62. Additionally, the first and second movable elements 24, 64 may be configured to move within the first and second pump housings 14, 54, respectively, in a substantially successive sequence, thereby providing a continuous fluid flow. In one example, the first movable element 24 in the first pump housing 14 is driven to pump fluid (or "fire") and while it is resetting, the second movable element 64 in the second pump housing 54 is driven to pump fluid. While the elements 24 and 64 are still resetting, a third movable element in a third pump (not shown) may be driven, etc. until the first movable element 24 in the first pump housing 14 is fully reset. The sequence may be repeated as needed or adjusted based on the desired application.

Figure 2:
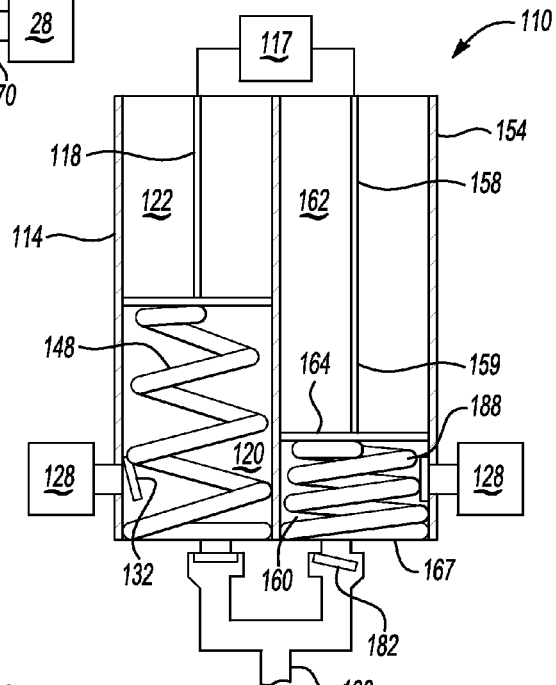
FIG. 2 is a schematic fragmentary sectional side view of a second embodiment for a pumping assembly.

Alternatively, as shown in a second embodiment in the pumping assembly 110 of FIG. 2, the biasing members may be extension springs 148 and 188 positioned in the first chambers 120 and 160, respectively. The pumping assembly 110 includes SMA wires 118, 158 positioned in first and second pump housings 114, 154, respectively. The pumping assembly 110 is similar to the pumping assembly 10 described above; thus only the differences are described below. The extension springs 148 and 188 are configured to bias the respective SMA wires 118, 158 towards their elongated positions. Referring to FIG. 2, in its hot or Austenite state, the SMA wire 118 extends the extension spring 148, thereby reducing the pressure in the first chamber 120 and selectively permitting the first chamber 120 to fill up with fluid from the fluid feed 128 (when the pressure differential across the inlet valve 132 reaches a sufficiently high value, as described with reference to FIG. 1).

Upon the removal of the activation signal, the SMA wires 118, 158 cool, and transition to their cold or Martensite states. Referring to FIG. 2, when the SMA wire 158 transitions to a cold state, the extension spring 188 urges the SMA wire 158 towards an elongated position 159. This moves a second movable element 164 towards a second end 167 of the second pump housing 154, thereby selectively permitting the fluid in the first chamber 160 to be pumped out through the nozzle 138 (when the pressure differential across the outlet valve 182 reaches a sufficiently high value, as described with reference to FIG. 1).

Thus in the second embodiment, the SMA wires 118, 158 are configured to selectively fill the respective first chambers 120, 160 with fluid while the extension springs 148, 188 are configured to apply a biasing force to selectively pump fluid out of the respective first chambers 120, 160. The SMA wires 118, 158 are positioned in the respective second chambers 122, 162; the extension springs 148, 188 are positioned in the respective first chambers 120, 160.

Figure 3:
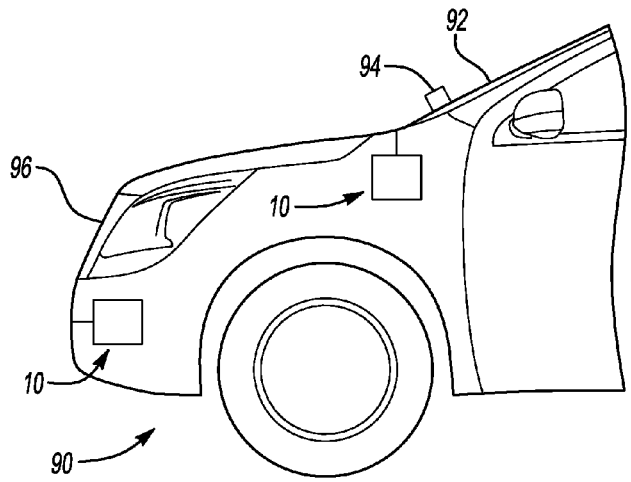
FIG. 3 is a schematic fragmentary side view illustrating a vehicle employing the pumping assembly.

Referring to FIG. 3, the assembly 10 may be employed as part of a windshield washer system in a vehicle 90 having a windshield 92 and a wiper system 94. The assembly 10 may be configured to pump fluid such as washer solvent when prompted by a vehicle operator through the controller 17 (shown in FIG. 1). The assembly 10 may be employed for rear or front windshields, side view mirrors and other vehicle components. Referring to FIG. 3, the assembly 10 may be employed as part of a washer system for a headlamp 96. In one example, the source of the fluid for the first chambers 20, 60 (shown in FIG. 1) is the same fluid reservoir in the vehicle 90. In another example, the first chambers 20, 60 receive fluid from different sources in the vehicle 90. The assembly 10 may also be employed for non-automotive applications where a pumping device is required.

Heated Fluid Option

Figure 4:
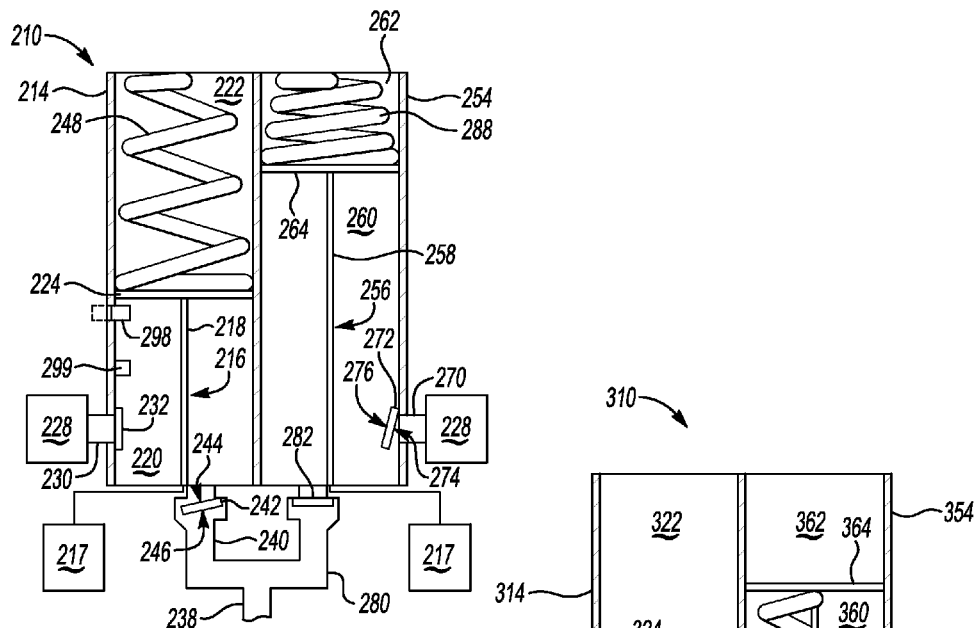
FIG. 4 is a schematic fragmentary sectional side view of a third embodiment for a pumping assembly, the assembly including a heated fluid option.

Referring to FIG. 4, a pumping assembly 210 illustrating a third embodiment is shown. The pumping assembly 210 includes actuators 216, 256 positioned in first and second pump housings 214, 254, respectively. As noted with respect to the first embodiment, the pumping assembly 210 may include just one pump or as many pumps as required for the particular application. At least a portion of the actuators 216, 256 are active materials that are configured to undergo a change in at least one attribute in response to an activation signal. A controller 217 may be operatively coupled to the actuators 216, 256 and configured to provide an activation signal. The activation signal may include, but is not limited to, a heat signal or an electrical signal, with the particular activation signal dependent on the active material employed. In the embodiment shown, the active materials are SMA wires 218, 258. For example, the controller 217 may direct an electrical current through the actuators 216, 256 to resistively heat the shape memory alloy components (SMA wires 218, 258) of the actuators 216, 256. The first pump housing 214 defines first and second chambers 220, 222 while the second pump housing 254 defines first and second chambers 260, 262.

Unlike the first embodiment, the SMA wires 218, 258 are positioned within the respective first chambers 220, 260 and configured to selectively heat the fluid in the respective first chambers 220, 260. In other words, the SMA wires 218, 258 may function as both a heating element for the fluid and a pump actuator. Optionally, extra power may be supplied by the controller 217, either as extra energy or time, to heat the fluid in the respective first chambers 220, 260.

The first chamber 220 is operatively connected to a fluid feed 228 through an inlet portion 230. In one example, the fluid feed 228 is a fluid reservoir in a vehicle. An inlet valve 232 is positioned between the first chamber 220 and the inlet portion 230. Referring to FIG. 4, the first chamber 220 is operatively connected to a nozzle 238 through an outlet portion 240. An outlet valve 242 is positioned between the first chamber 220 and the outlet portion 240. In the embodiment shown, the inlet and outlet valves 232, 242 are one-way flap valves.

Similar to the first pump housing 214, the second pump housing 254 includes a second movable element 264 separating first and second chambers 260, 262. Referring to FIG. 4, the first chamber 260 is operatively connected to the fluid feed 228 through an inlet portion 270. An inlet valve 272 is positioned between the first chamber 260 and the inlet portion 270. Referring to FIG. 4, the first chamber 260 is operatively connected to the nozzle 238 through an outlet portion 280. An outlet valve 282 is positioned between the first chamber 260 and the outlet portion 280. In the embodiment shown, the inlet and outlet valves 272, 282 are one-way flap valves.

In one example, the controller 217 directs an electrical current to the SMA wires 218, 258. The SMA wires 218, 258 are characterized by respective predetermined lengths. The activation signal may be an electrical signal that resistively heats the shape memory alloy components of the actuators 216, 256 to a point where a crystallographic phase transformation occurs from Martensite to Austenite. In other words, the SMA wires 218, 258 transition from a cold state to a hot state.

The SMA wire 218 in the first pump housing 214 is shown in a hot state. When activated to its hot state, the SMA wire 218 contracts or reverts to its predetermined length and increases in modulus, thereby extending the extension spring 248 (and pulling the first movable element 224). This compresses the fluid pooled in the first chamber 220, increasing the pressure $P_2$ in the first chamber 220.

Referring to FIG. 4, a first face 244 of the outlet valve 242 is subject to the second pressure $P_2$, which is the pressure in first chamber 220. A second face 246 of the outlet valve 242 is subject to a third pressure $P_3$, which is the pressure in the outlet portion 240. When the pressure differential (difference between $P_2$ and $P_3$) across the first and second faces 244, 246 of the outlet valve 242 reaches a sufficiently high value, the outlet valve 242 opens and fluid from the first chamber 220 is pumped through the outlet portion 240. As the fluid leaves the first chamber 220, its pressure $P_2$ is reduced, thereby reducing the pressure differential (difference between $P_2$ and $P_3$). When the pressure differential across the first and second faces 244, 246 falls below a predetermined value, the outlet valve 242 closes.

Upon the removal of the activation signal, the SMA wires 218, 258 cool, and transition to their cold or Martensite states. The extension springs 248, 288 bias or urge the SMA wires 218, 258 to their elongated positions. The SMA wire 258 in the second pump housing 254 is shown in a cold or Martensite state, with the extension spring 288 in a resting configuration.

Referring to FIG. 4, a first face 274 of the inlet valve 272 is subject to a first pressure $P_1$, which is the pressure in the inlet portion 270. A second face 276 of the inlet valve 272 is subject to a second pressure $P_2$, which is the pressure in the first chamber 260. When the pressure differential (difference between $P_1$ and $P_2$) across the first and second faces 274, 276 reaches a sufficiently high value (such as when the first chamber 260 is substantially empty), the inlet valve 272 opens (as shown in FIG. 1) and fluid from the fluid feed 228 enters the first chamber 260 through the inlet portion 270. As the fluid enters and pools in the first chamber 260, its pressure $P_2$ is increased, thereby reducing the pressure differential (difference between $P_1$ and $P_2$). When the pressure differential across the first and second faces 274, 276 falls below a predetermined value, the inlet valve 272 closes.

Thus in the third embodiment, the SMA wires 218, 258 are configured to selectively pump fluid out of the respective first chambers 220, 260 while the extension springs 248, 288 are configured to apply a biasing force to selectively fill the respective first chambers 220, 260. The SMA wires 218, 258 are positioned in the respective first chambers 220, 260; the extension springs 248, 288 are positioned in the respective second chambers 222, 262.

Figure 5:
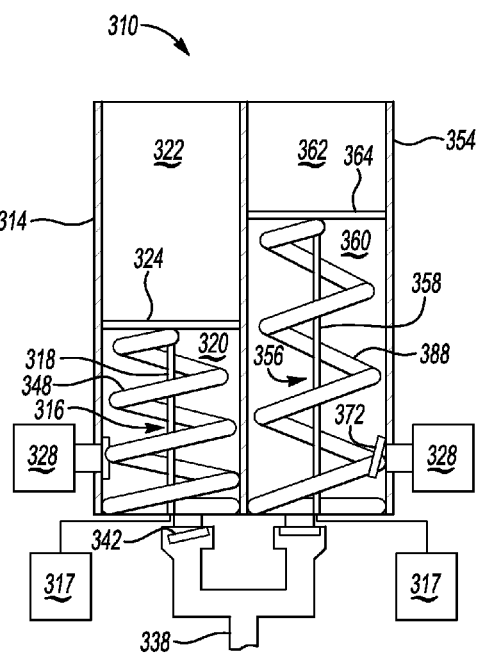
FIG. 5 is a schematic fragmentary sectional side view of a fourth embodiment for a pumping assembly, the assembly including a heated fluid option.

Alternatively, as shown in the pumping assembly 310 of FIG. 5, the biasing members may be compression springs 348 and 388 positioned in the first chambers 320 and 360, respectively. The pumping assembly 310 includes one or more pumps. The pumping assembly 310 includes actuators 316, 356 in first and second pump housings 314, 354, respectively. The actuators 316, 356 include active materials, such as SMA wires 318, 358, that are configured to undergo a change in at least one attribute in response to an activation signal. A controller 317 may be operatively coupled to the actuators 316, 356 and configured to provide respective activation signals. The first pump housing 314 defines first and second chambers 320, 322 while the second pump housing 354 defines first and second chambers 360, 362.

Referring to FIG. 5, the SMA wire 318 is shown in a hot state. In their hot state, the SMA wires 318, 358 compress the compression springs 348, 388 (and pull the first and second movable elements 324, 364), thereby increasing the pressure in the respective first chambers 320, 360 and selectively permitting the fluid in the respective first chambers 320, 360 to be pumped out through the nozzle 338 (when the pressure differential across the outlet valve 342 reaches a sufficiently high value, as described with reference to FIG. 1).

Referring to FIG. 5, the SMA wire 358 is shown in a cold state and the compression spring 348 is in a rest configuration. As the SMA wires 318, 358 transition to their respective cold states, the compression springs 348, 388 urge the SMA wires 318, 358 to their elongated positions, thereby selectively permitting the first chambers 320, 360 to fill up with fluid from a fluid feed 328 (when the pressure differential across the inlet valve 372 reaches a sufficiently high value, as described with reference to FIG. 1).

Thus in the fourth embodiment, the SMA wires 318, 358 are configured to selectively pump fluid out of the respective first chambers 320, 360 while the compression springs 348, 388 are configured to apply a biasing force to selectively fill the respective first chambers 320, 360. The SMA wires 318, 358 and compression springs 348, 388 are positioned in the respective first chambers 320, 360.

Pre-Heating Option

Referring to FIGS. 4-5, optionally, a secondary electrical signal is configured to resistively heat the shape memory alloy components of the actuators 216, 256, 316, 356 but not to the point where a crystallographic phase transformation occurs from Martensite to Austenite. In other words, SMA wires 218, 258, 318, 358 do not transition from a cold state to a hot state but are heated in order to perform a pre-heating or pre-warming function for the fluid in the first chambers 220, 260, 320, 360 prior to the fluid being pumped out. By keeping the fluid warm in the first chambers 220, 260, 320, 360, the time required for pump heated fluid is minimized.

Figure 6:
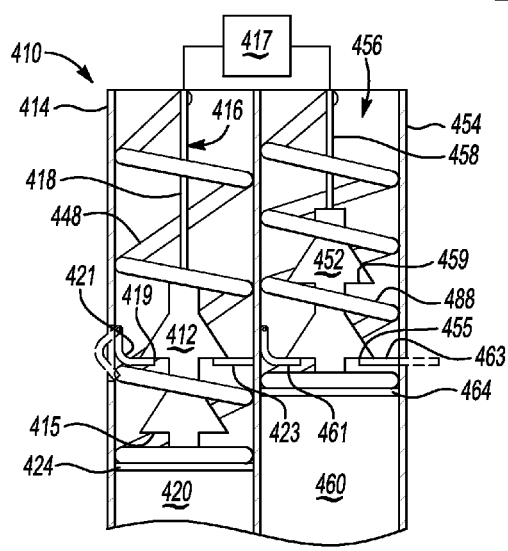
FIG. 6 is a schematic fragmentary sectional side view of a fifth embodiment for a pumping assembly.

Referring to FIG. 6, a pumping assembly 410 illustrating a fifth embodiment is shown. The pumping assembly 410 includes actuators 416, 456 positioned in first and second pump housings 414, 454, respectively. In the embodiment shown, the actuators 416, 456 include active materials such as SMA wires 418, 458 that are configured to undergo a change in at least one attribute in response to an activation signal. The assembly 410 is similar to the pumping assembly 10 in FIG. 1 and described above; thus only the differences are described. Only a portion of the pumping assembly 410 is shown (for example, inlet and outlet valves are not shown in FIG. 6).

Ratchets 412, 452 are positioned in first and second pump housings 414, 454, respectively. The ratchets 412, 452 define one or more steps. Each ratchet step may be configured to equate to a single shot of fluid dispensed from the first chambers 420, 460. The appropriate number of steps for a particular application may be selected by one of ordinary skill in the art. In the embodiment shown in FIG. 6, the ratchet 412 defines first and second steps 415, 419. The ratchet 452 defines first and second steps 455, 459. The ratchets 412, 452 may be operatively connected to the respective actuators 416, 456 at one end and the respective first and second movable elements 424, 464 at another end.

Retractable members such as hinged pawls 421, 461 may be operatively connected to the first and second housing 414, 454. The pawls 421, 461 are configured to be selectively movable between extended and retracted positions on the direction of the controller 417 or a separate controller. As previously described with reference to FIG. 1, as the SMA wires 418, 458 cool and transition to their cold states, compression springs 448, 488 urge the SMA wires 418, 458 towards their elongated position 59, thereby compressing the fluid within the first chambers 420, 460.

When prompted by an activation signal from controller 417 or another source, the pawls 421, 461 may selectively engage with the first steps 415, 455, thereby dispensing or pumping a predetermined first quantity of fluid from the first chambers 420, 460. Referring to FIG. 6, the pawl 461 is shown engaged with the first step 455. In other words, the pawls 421, 461 hold or block the first and second movable elements 424, 464 at a specific position within the first and second pump housings 414, 454 to allow the sizing of each single shot of fluid (such as washer solvent) pumped from the respective first chambers 420, 460.

Upon another activation signal, the pawls 421, 461 may selectively disengage from the first steps 415, 455 and then selectively engage with the second steps 419, 459, thereby dispensing a predetermined second quantity of fluid from the first chambers 420, 460. Referring to FIG. 6, the pawl 421 is shown engaged with the second step 419. Alternatively, a retractable member such as selectively retractable blocks 423, 463 (retractable position shown in phantom for block 463) may be employed in place of the pawls 421, 461.

Optionally, referring to FIG. 4, a first position-holding member 298 is operatively connected to the first pump housing 214 and movable between a retracted (shown in phantom) and extended position. The first position-holding member 298 is configured to be selectively extendable in order to hold the position of or block the motion of the first movable element 224, thereby dispensing a predetermined first quantity of fluid from the first chamber 220. Optionally, referring to FIG. 4, a second position-holding member 299 may be operatively connected to the first pump housing 214 and spaced from the first position-holding member 298. The second position-holding member 299 is configured to be selectively extendable in order to hold the position of or block the motion of the first movable element 224, thereby dispensing a predetermined second quantity of fluid from the first chamber 220. In one example, the first and second position-holding members 298, 299 are composed of a shape memory alloy that may be activated by the controller 217. The first position-holding members 298, 299 may be employed in each of the first, second, third and fourth embodiments.

Figure 7:
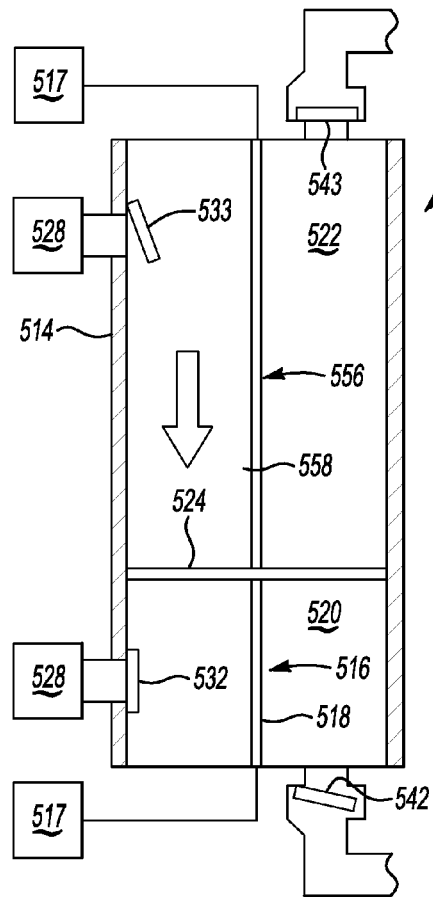
FIG. 7 is a schematic fragmentary sectional side view of a sixth embodiment for a pumping assembly, shown in a first state.
Figure 8:
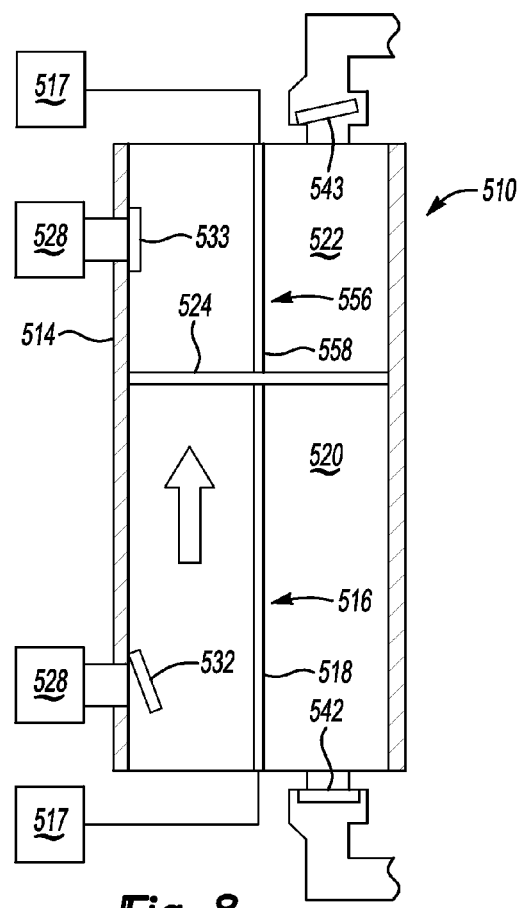
FIG. 8 is a schematic fragmentary sectional side view of the pumping assembly of FIG. 7, shown in a second state.

Referring to FIGS. 7 and 8, a pumping assembly 510 illustrating a sixth embodiment, having dual fluid chambers within a pump, is shown. The pumping assembly 510 includes a first pump housing 514 defining first and second chambers 520, 522. First and second actuators 516, 556 are positioned in the first and second chambers 520, 522, respectively. The first and second actuators 516, 556 may actively and independently drive a movable element 524.

Referring to FIGS. 7-8, first and second inlet valves 532, 533 are operatively connected to the first and second chambers 520, 522, respectively, and configured to selectively permit the filing of fluid from a fluid feed 528 therein. Optionally, the first and second chambers 520, 522 may be connected to separate fluid feeds. First and second outlet valves 542, 543 are operatively connected to the first and second chambers 520, 522, respectively, and configured to selectively permit fluid to be pumped out of the respective chambers 520, 522. In the embodiment shown, the valves 530, 531, 532, 533 are one-way flap valves. It is to be noted that the first five embodiments (shown in FIGS. 1-2 and 4-6) described previously may also include inlet and outlet valves in each of the first and second chambers.

Referring to FIGS. 7-8, the first and second actuators 516, 556 include first and second active materials configured to undergo a change in attribute in response to first and second activation signals, respectively. A controller 517 may be operatively coupled to the actuators 516, 556 to provide the activation signals. In one example, the active materials are SMA wires. The SMA wires 518, 558 are characterized by respective predetermined lengths. The activation signal may be an electrical signal that resistively heats the shape memory alloy components of the actuators 516, 556 to a point where a crystallographic phase transformation occurs from Martensite to Austenite. In other words, the SMA wires 518, 558 transition from a cold state to a hot state.

Referring to FIG. 7, when activated to its Austenite or hot state by a first activation signal, the SMA wire 518 contracts (and increases in modulus), thereby pulling the movable element 524 in the direction shown. This increases the pressure in the first chamber 520, allowing fluid to be pumped out of the first chamber 520 (as the first outlet valve 542 is opened and the first inlet valve 532 is closed; the functioning of the valves is described in detail with respect to the first embodiment). Furthermore, a pressure difference is created between the second chamber 522 and the fluid feed 528, allowing fluid to be pulled into the chamber 522 (by opening the second inlet valve 533 and closing the second outlet valve 543). Upon the removal of the first activation signal, the SMA wire 518 cools, and transition to its cold or Martensite state.

Referring to FIG. 8, when activated to its Austenite or hot state by a second activation signal, the SMA wire 558 contracts (and increases in modulus), thereby pulling the movable element 524 in the direction shown. This increases the pressure in the second chamber 522, allowing fluid to be pumped out of the second chamber 522 (as the second outlet valve 543 opens and the second inlet valve 533 closes). Furthermore, a pressure difference is created between the first chamber 520 and the fluid feed 528, allowing fluid to be pulled into the first chamber 520 (by opening the first inlet valve 532 and closing the first outlet valve 542). Upon the removal of the second activation signal, the SMA wire 558 cools, and transitions to its cold or Martensite state. The beginning of the heating and cooling times, i.e. the first and second activation signals, may be set to be out of sync, as needed for the particular application.

The controllers 17, 117, 217, 317, 417, 517 may be embodied as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. The controllers 17, 117, 217, 317, 417, 517 may include such electronic components as necessary to generate an electrical signal capable of resistively heating a shape memory alloy material. The controllers 17, 117, 217, 317, 417, 517 may include additional modes such as analog circuitry or operator-controlled functions such that an operator can direct the generation of the required electrical signals.

While the best modes for carrying out the invention have been described in detail, those familiar with the art to which this invention relates will recognize various alternative designs and embodiments for practicing the invention within the scope of the appended claims.

The invention claimed is:
1. A pumping assembly comprising:
a first pump housing;
a first movable element selectively movable within the first pump housing;
a first actuator including a first active material configured to undergo a change in attribute in response to a first activation signal, the first active material being operatively connected to the first movable element such that the change in attribute causes the first movable element to move within the first pump housing;
a second actuator including a second active material configured to undergo a change in attribute in response to a second activation signal, the second active material being operatively connected to the first movable element such that the change in attribute causes the first movable element to move within the first pump housing;

wherein the first movable element is configured to divide the first pump housing into a first and a second chamber including a first and a second fluid, respectively;

wherein the first actuator is positioned in the first chamber and configured to selectively pump the first fluid out of the first chamber in response to the first activation signal;

wherein the second actuator is positioned in the second chamber and configured to selectively pump the second fluid out of the second chamber in response to the second activation signal;

wherein the first actuator is configured to operate independently of the second actuator;

wherein the first active material is a shape memory alloy material having a crystallographic phase that is changeable between Austenite and Martensite in response to the first activation signal;

a controller programmed to provide a pre-heating electrical signal; and wherein the pre-heating electrical signal is configured to resistively heat the shape memory alloy material without causing the crystallographic phase change, thereby selectively pre-heating the first fluid in the first chamber.

2. The assembly of claim 1, wherein the shape memory alloy (SMA) material is an SMA wire having a length, the SMA wire being configured to contract in length in response to the activation signal.

3. The assembly of claim 1, further comprising:

an inlet valve operatively connected to the first chamber, the inlet valve being configured to selectively permit the first fluid from a fluid feed to fill the first chamber; and an outlet valve operatively connected to the first chamber, the outlet valve being configured to selectively permit the first fluid to be pumped out of the first chamber.

4. The assembly of claim 1, further comprising:

an extension spring positioned in the second chamber and configured to apply a biasing force to selectively fill the first chamber with the first fluid; and wherein the first actuator is configured to extend the extension spring in response to the first activation signal, thereby selectively pumping the first fluid out of the first chamber.

5. The assembly of claim 1, further comprising:

a compression spring positioned in the first chamber and configured to apply a biasing force to selectively fill the first chamber with the first fluid; and wherein the first actuator is configured to compress the compression spring in response to the first activation signal, thereby selectively pumping the first fluid out of the first chamber.

6. The assembly of claim 1, further comprising:

a ratchet operatively connected to the first pump housing and defining a first step; and a retractable member operatively connected to the first pump housing and configured to selectively engage with the first step, thereby dispensing a predetermined first quantity of fluid from the first chamber.

7. The assembly of claim 6, further comprising a second step defined by the ratchet, the retractable member being configured to selectively engage with the second step in order to dispense a predetermined second quantity of fluid from the first chamber.

8. The assembly of claim 1, further comprising:

first and second inlet valves operatively connected to the first and second chambers, respectively, the first and second inlet valves being configured to selectively permit the first and second fluids from a fluid feed to fill the first and second chambers, respectively; and first and second outlet valves operatively connected to the first and second chambers, respectively, the first and second outlet valves being configured to selectively permit the first and second fluids to be pumped out of the first and second chambers, respectively.

* * * * *